3,497,342
METHOD FOR DESICCATING AND DEFOLIATING PLANTS WITH p-NITROPHENYL ARSINIC ACID DERIVATIVES
Max Eugene Chiddix, Easton, Pa., assignor to GAF Corporation, a corporation of Delaware
No Drawing. Filed May 19, 1966, Ser. No. 551,239
Int. Cl. A01n 5/00, 9/20
U.S. Cl. 71—70      4 Claims

---

ABSTRACT OF THE DISCLOSURE

Plants are defoliated by applying to the foliage an arsinic acid compound having the formula:

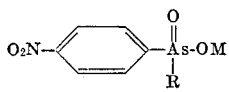

wherein R represents an alkyl radical selected from the group consisting of methyl, ethyl, and propyl radicals and M represents a member selected from the group consisting of hydrogen, an alkali metal, an alkaline earth metal, ammonium and amino salt-forming groups.

---

This invention relates to chemical treatment of vegetation to obtain leaf desiccation and defoliation. More particularly, it pertains to the desiccation and/or defoliation of vegetation by means of a selected arsinic compound.

The rarity of chemicals with defoliant action, or with an appropriate type of leaf desiccation, is well recognized in agricultural science. Although many chemicals are known to have herbicidal properties, few have been found which are useful as defoliants. Experience has shown that a chemical which is herbicidal in its action on a particular plant is not usually a defoliant for the same plant. However, a chemical which is a defoliant may also be a herbicide, if used in amounts excessive for defoliation.

Development of successful defoliants has been a slow process. Prior to 1948 calcium cyanamide was the only commercially successful and available defoliant. Since 1948 only about a dozen new defoliants have been found and developed. These include, for example, monosodium cyanamide, ammonium thiocayanate, potassium cyanate, sodium chlorate-sodium pentaborate, sodium chlorate-magnesium chloride and 3,6-endoxohexahydrophthalic acid and its derivatives (U.S. 2,576,080, 2,576,081, and 2,576,082).

Arsenic compounds have found wide use as herbicides. Acid-arsenical sprays have been used for several decades to treat and kill many thousands of acres of morning-glory, Russian knapweed, alkali mallow, and other perennial weeds in California and other Western states. The recommended spray (see for example "Weed Control" by Robbins, Crafts and Raynor, McGraw-Hill Book Company, 1942, p. 219) must contain at least one-half percent arsenic trioxide by weight and five percent sulfuric acid. Lead arsenate has been used at the rate of 20 to 25 lbs. per 1000 square feet to control crabgrass. Ibid. p. 403. Arsenic pentoxide, which forms arsenic acid in aqueous solution, has been used in the proprietary herbicide Pentox for killing weeds. Arsenic trichloride, formed by refluxing arsenic trioxide with concentrated hydrochloric acid, forms the poisonous principle in another proprietary herbicide, sold as K.M.G. Another trivalent arsenic compound, sodium arsenite, is the pricipal constituent of many other commercial weed killers. The trivalent form of arsenic has been used more commonly than the pentavalent form because of the greater toxicity of the trivalent form. When applied to cotton plants, sodium arsenite is known to kill and desiccate the plants.

I have now unexpectedly found that the leaf desiccation and defoliation of vegetation can be carried out with good commercial success and at a high rate of effectiveness by using novel p-nitrophenyl alkyl arsinic acid herbicidal compounds having the general formula:

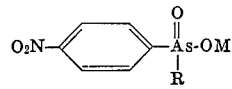

wherein R represents an alkyl radical and M represents hydrogen or a salt forming moiety.

More particularly, my invention pertains to the use of arsinic acid derivatives of the above formula wherein R represents a member selected from the group consisting of methyl, ethyl, and propyl radicals and wherein M represents a member selected from the group consisting of hydrogen, an alkali metal, such as sodium, potassium, etc., an alkaline earth metal such as magnesium, calcium, barium, etc., an ammonium ion (NH$_4$+), and an amine salt such as a moiety from an amine such as methylamine, trimethylamine, triethylamine, ethanolamine, dibutylamine, ethylene diamine, morpholine, pyridine and the like.

The arsinic acid compounds of the instant invention may be prepared by reacting various alkyldichloroarsine compounds with a diazonium compound to directly form the arsinic acid as illustrated by the following reaction:

(1)

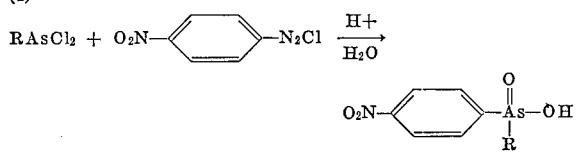

wherein R is lower alkyl.

The intermediate alkyldichloroarsines used as starting materials may be prepared according to the following known reactions:

(2)      As(ONa)$_3$+RX→RAsO(ONa)$_2$ (3)      RAsO(ONa)$_2$+HCl+SO$_2$→RAsCl$_2$ wherein RX is an alkyl halide, such as, methyl bromide, ethyl bromide and propyl bromide. Said reactions may be found more fully described in J. Am. Chem. Soc. 44, pages 805 and 1356, (1922).

It is obvious from reaction 1, depicted above, that the free arsinic acid is formed first. The free acid can be easily converted to salts, such as alkaline earth metal salts, an ammonium salt, amine salts or alkali metal salts by neutralization with the corresponding base. Examples of such bases would be sodium hydroxide, potassium hydroxide, ammonium hydroxide, calcium hydroxide, magnesium hydroxide, barium hydroxide, lithium hydroxide, calcium carbonate, methylamine, trimethylamine, triethylamine, dimethylamine, ethanolamine, diethanolamine, triethanolamine, ethylene diamine, morpholine, piperidine, pyridine, imidazoline, and quinoline. This does not depart from the scope of this instant invention, since the salt is merely a matter of choice.

By vegetation coming within the purview of this invention, I mean any plant life, particularly weeds, deciduous trees, vines, broadleaf plants, cereals, cotton, beans and peas. Specific test plants include Black Valentine bean, Heavenly Blue morning-glory, Scarlet Globe radish and Lincoln soybean and two cereal species, Clinton oats and rice, P.I. 8970. The arsinic acid compounds may be applied to the foliage in their free acid form or in their salt form. In a living plant, because of the effect of buffer salts, the arsinic acid undoubtedly is converted to a salt during translocation.

The spraying or dusting of vegetation may be carried out by any known means, for example, by means of ground spraying or by airborne spraying equipment. While spraying and dusting is best done with airborne equipment, from the standpoint of efficiency, other forms of spraying equipment may be used if the usual precautions well known in the art for handling posionous materials are taken. Equipment should be thoroughly cleaned before use to remove any chemicals which could react with the arsinic acid compound to reduce its desiccating and defoliating activity. After use, the equipment should be cleaned to remove traces of arsinic acid which might contaminate other sprays used from the same equipment. Spraying is usually done under favorable conditions of sunlight, moisture, humidity and other factors. However, these factors have not been found to be critical in the successful practice of our invention.

In the practice of our invention for leaf desiccation and/or defoliation a solution of the arsinic acid compound is sprayed on the vegetation at a conventional herbicidal concentration. For example, an aqueous, an alcoholic or an acetone solution of the arsinic acid compound or one of its salts may be used in which the arsinic acid compound is present in amounts from about 1% to 50% by weight of the solution. The rate of application may vary from anywhere between about 0.1 pound to about 10 pounds per acre. Especially good results have been obtained by application rates equivalent to about 0.1 pound and 1 pound per acre of the arsinic acid.

Customary formulating techniques may be used in preparing the arsinic acid compound solution to make it more efficient in covering and penetrating the foliage of the plant to which it is applied. For example, a small amount of surface active agent, up to about 2% by weight of solution, may be added to an aqueous solution of the arsinic acid to increase its wetting and spreading ability on the leaves on which it is sprayed. Examples of suitable surface active agents include the alkyl aryl sulfonates, the alkyl polyglycol ethers, the alkylaryl polyglycol ethers, the alkyl sulfates and the sulfoscuccinic esters. Typical agents are Igepal CO 630, Tween 20, and Santomerse D, a sulfonated keryl benzene in which the keryl group has an average molecular weight equivalent to a decyl group. Other compounds which may be incorporated into the spray solution include stickers, such as finely divided resinous materials, and thickeners, such as polyvinyl alcohol or polyacrylic acid.

Further advantages are illustrated, but are not to be construed as limited, by the following examples.

EXAMPLE I

Ethyl p-nitrophenyl arsinic acid

This compound was prepared by the known process described in J. Am. Chem. Soc. 62, p. 167 (1940).

One hundred and twelve grams (0.81 mole) of p-nitroaniline was placed in two liters of absolute alcohol with 85 grams of $H_2SO_4$ and 194 grams (1.38 mole) of ethyl dichloroarsine. The solution was cooled to 0° C. and diazotized with 57.3 grams (0.83 mole) of $NaNO_2$ in 120 ml. of water to an end point with starch-iodine paper. One gram of cuprous bromide was added and the mixture thoroughly stirred and heated to 60° C. until no more $N_2$ was evolved. The mixture was cooled to room temperature and filtered. The filtrate was concentrated and the concentrate dissolved in a minimum amount of water. This was passed through an ion-exchange resin (IR–120H+). Concentration of the various aqueous fractions collected upon elution first with water and then with dilute aqueous ammonia yielded 41 grams of yellow solid. The fifth fraction eluted with water weighed 6 grams after drying.

This ethyl p-nitrophenyl arsinic acid had a melting point of 161–165° C. and was soluble in alcohol and slightly soluble in acetone and water and may be represented by the formula:

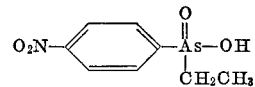

Said arsinic acid had a herbicidal activity rating of 24 at one pound/acre, the highest value obtainable by the test method of Example II. These results included complete defoliation of the Black Valentine bean plants.

Similar results may be obtained by substituting methyl dichloroarsine or propyl dichloroarsine for said ethyl dichloroarsine to produce methyl or propyl p-nitrophenyl arsinic acids having the formula:

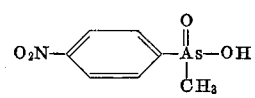

and

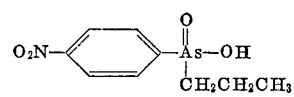

EXAMPLE II

Test Procedure

In a spray cabinet of Plexiglas having a bottom area of three square feet were placed pots containing plants of broadleaf species, i.e. Black Valentine bean, Heavenly Blue morning-glory, Scarlet Globe radish and Lincoln soybean, along with cereal species, i.e. Clinton oats and rice, P.I. 8970. A spray solution was made up by dissolving 34 mg. of the test compound in 12.5 ml. of acetone containing 0.5% Tween 20. Seven days after planting, 12 ml. of the spray solution were vertically directed evenly over the three square feet of area and on to the potted seedlings at a spray rate equivalent to one pound per acre. The spray was applied to twelve pots simultaneously (two pots of each species). Visual observations were then made of the plants. Said observations were made at intervals of 2 days, 5 days and 10 to 14 days after treatment.

The various test compounds were given a rating of from 1 to 4 with regard to their herbicidal activity on each plant and cereal species tested. A rating of 1 indicates no discernable herbicidal activity. A rating of 2 indicates a slight, but not marked herbicidal effect. A rating of 3 indicates moderate or considerable injury to plant tissues. A rating of 4 indicates marked herbicidal activity characterized by killing or severe necrosis, defoliation, or other effects leading to death. The maximum rating for one species at one rate over all observed effects is 4. Thus, the highest rating for one rate of application on all the plant species tested is 24 (a total of 4 for each of the six plant species rated). Conversely, a rating of 6 indicates no visible effect. Those compounds which receive a rating of 10 or above are fairly active; a rating of 12 to 17 is indicative of good activity, while a rating of 18 to 24 is evidence of very high activity.

The instant p-nitrophenyl ethyl arsinic acid of Example I exhibited a herbicidal activity rating of 24 at a spray rate equivalent to one pound per acre in the above described test.

Similar results may be obtained with compounds, such as p-nitrophenyl methyl arsinic acid and p-nitrophenyl propyl arsinic acid.

Various modifications and variations of this invention will be obvious to a worker skilled in the art and it is understood that such modifications and variations are to be included within the purview of this application and the spirit and scope of the appended claims.

I claim:
1. The method of desiccating and defoliating plants which comprises applying to the foliage an arsinic acid compound having the formula:

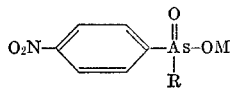

wherein R represents an alkyl radical selected from the group consisting of methyl, ethyl, and propyl radicals and M represents a member selected from the group consisting of hydrogen, an alkali metal, an alkaline earth metal, ammonium and methylamino, trimethylamino, triethylamino, ethanolamino, dibutylamino, ethylenediamino, morpholino and pyridino groups at a rate sufficient to cause defoliation of said plants and equivalent to from 0.1 to 10 pounds of arsinic acid per acre of plants.

2. The method according to claim 1, wherein R represents a methyl radical and M represents hydrogen.

3. The method according to claim 1, wherein R represents an ethyl radical and M represents hydrogen.

4. The method according to claim 1, wherein R represents a propyl radical and M represents hydrogen.

References Cited
UNITED STATES PATENTS

| | | | |
|---|---|---|---|
| 2,760,854 | 8/1956 | La Lande | 71—69 |
| 3,056,668 | 10/1962 | Sprague | 71—97 |
| 3,130,035 | 4/1964 | Culver | 71—69 |
| 2,912,456 | 11/1959 | Fookes | 71—70 |
| 3,378,364 | 4/1968 | Neuville et al. | 71—70 |

OTHER REFERENCES

Nagawa et al.: "Agricultural Fungicides and Pesticides" (1957), CA 52, p. 9507 (1958).

LEWIS GOTTS, Primary Examiner

G. HOLLRAH, Assistant Examiner

U.S. Cl. X.R.

71—74, 88, 92, 94, 97; 260—247, 271, 309.6, 440